United States Patent Office 3,697,406
Patented Oct. 10, 1972

3,697,406
APPARATUS FOR ELECTROPHORETIC
SEPARATION
Per Just Svendsen, Glostrup, Denmark, assignor to
LKB-Produkter AB, Bromma, Sweden
Filed Dec. 29, 1970, Ser. No. 102,484
Claims priority, application Sweden, Jan. 15, 1970,
502/70
Int. Cl. B01k 5/00
U.S. Cl. 204—299         6 Claims

ABSTRACT OF THE DISCLOSURE

An elution chamber for an electrophoretic separation column. The chamber is located at the lower end of the column above the lower end electrode chamber and is separated from the electrode chamber by membrane. The lower end of the elution chamber has a diameter which exceeds the diameter of the column. Elution liquid is supplied to the chamber either from the membrane or from an inlet at the periphery of the elution chamber and the chamber is drained from a central outlet.

---

The present invention refers to an apparatus for electrophoretic separation, comprising a column for the substances to be separated, electrodes at the upper and lower end of the column, and an outlet for the separated substances at the lower end of the column. More particularly the invention refers to an apparatus for the elution through the outlet of substances separated by an electric field applied to the column.

In an apparatus for electrophoretic separation of the type defined above, the separated substances reach the bottom of the column zone by zone. It is important that the elution of the separated substances is performed in such a way that the separated zones do not get mixed up with one another. Such elution has, however, turned out to be very difficult in the devices known per se, especially when the column is filled with a gel in which the liquid flow is little or none. In such columns the separated substances have generally been eluted by means of a special elution liquid or by the electrolyte in the bottom electrode chamber. In order to obtain a complete elution it is, however, important that the elution liquid sweeps over the complete cross section of the column. In order to achieve this the elution liquid has been supplied at a number of circumferential inlets of the column, the elution liquid thus flowing radially inwards in a so called elution chamber provided with an outlet at the center of the column. The results of the elution have, however, not turned out quite satisfactory, and especially at the periphery of the column the elution has been incomplete. The radial flow also implies a risk that separated substances are accumulated at the bottom of the elution chamber. In several applications, e.g. when proteins are separated, such accumulation might result in a decomposition of the substances.

It is an object of the present invention to provide an apparatus for electrophoretic separation in which the separated substances are eluted in a new way which permits a perfect elution all over the cross section of the column.

Another object of the invention is to provide an apparatus which could easily be modified to be used for different methods of electrophoretic separation to be described below.

The apparatus according to the invention is characterized in, that it comprises an electrode chamber, arranged at the bottom of the column, said chamber containing the bottom electrode, and being provided with an inlet and an outlet for the electrolyte, an elution chamber arranged above said electrode chamber and separated from the electrode chamber by a membrane, the centre of the elution chamber being connected to an elution outlet for the separated substances, the diameter of the upper end of the elution chamber being substantially equal to the diameter of the column and the diameter of the lower end of the elution chamber, delimited by the membrane, exceeding the diameter of the upper end of the said elution chamber.

In the apparatus according to the invention the electrolyte is used as an elution liquid. The electrolyte flows upwards through the electrode chamber and the complete surface of the porous membrane, through the elution chamber towards the elution outlet arranged in the centre of the chamber, the radial flow velocity increasing from the periphery towards the elution outlet. The flow in the elution chamber is thus directed radially inwards and axially upwards which prevents the separated substances from being accumulated in the porous membrane that forms the bottom of the elution chamber. As the lower end of the elution chamber has a diameter that exceeds the diameter of the upper end of the chamber, the elution liquid will sweep all over the cross section of the column, including its peripheral part. The diameter of the lower end of the elution chamber preferably exceeds the diameter of the upper end by 5–20%.

Other objects, features and advantages of this invention will be obvious to those skilled in the art and will become apparent from the following description of the invention taken in connection with the accompanying drawing in which.

Figure 1:
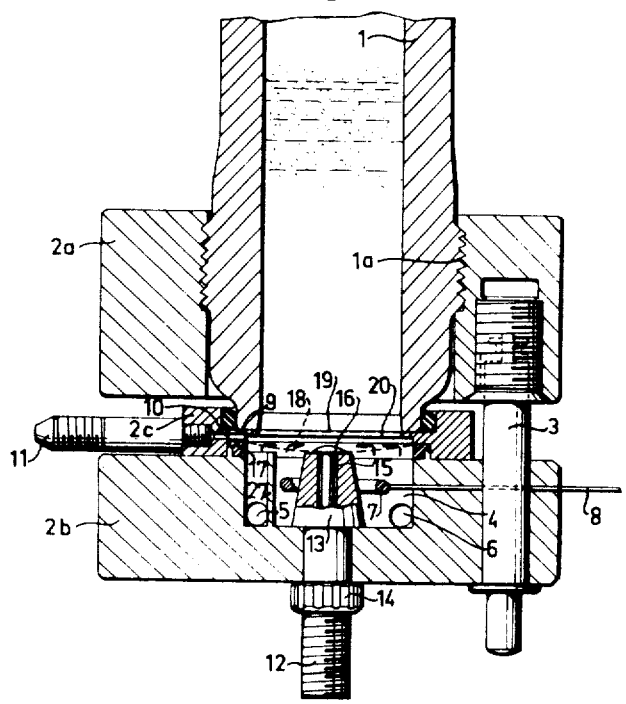
FIG. 1 is a cross sectional view of an apparatus according to the invention comprising an elution chamber to be used when the column is containing a gel.

In FIG. 1 reference 1 denotes a column the lower end of which is provided with three members 2a, 2b, and 2c connected to each other by screws 3. In the member 2b an electrode chamber 4 is arranged. The chamber 4 is provided with a circular electrode 7 connected to a current source via a conductor 8. An electrolyte can be supplied to the electrode chamber via an inlet 6 and the chamber is drained by an outlet 5. The electrode chamber 4 further comprises a vertical partition 27, the electrolyte passing over the upper edge of the partition. By means of this partition a good circulation is obtained in the chamber.

A flange 9 in the member 2c forms a seat for the lower end surface of the column 1, the column engaging the flange when inserted in the member. The inner diameter of the flange 9 is substantially equal to the inner diameter of the column 1 and this diameter is smaller than the diameter of the chamber 4. The flange 9 is provided with a channel 10 connected to a tube 11.

Through the bottom of the member 2b a tube 12 is inserted, the upper end of the tube being provided with a head 13, located within the electrode chamber. The head is kept in position by a nut 14. A narrower tube 15 can be inserted from the top of the tube 12, the tube 15 being provided with a flange 16 which engages the upper surface of the head 13. The tube 15 is fixed by a bushing not shown in the figures.

The arrangement according to FIGS. 1 and 2 operates as follows. The member 2b is provided with a ring 17 having an inner diameter equal to the diameter of the electrode chamber 4. On the ring 17 a porous membrane 18 is arranged, e.g. a cellulose acetate membrane. The tube 15 is then inserted through a central bore in the porous membrane and is attached by clamping the central part of the porous membrane between the flange 16 and the head 13. The member 2c is then mounted on the member 2b and a porous membrane 19 e.g. a cellulose acetate membrane is mounted on the flange 9. The column 1 which contains a gel is then attached to the member 2a by threads 1a. The membrane 19 will then support the gel column. An O-ring 26 tightens the column 11 against the member 2c. The electrode chamber 4 is then filled with an electrolyte through the channel 6. The electrolyte flows up through the porous membrane 18 and fills the elution chamber 20 formed between the membranes 18 and 19. The air within the chamber 20 is drained through the channel 10 and the connecting tube 11 which is then closed by means of a valve not shown in the figure. An electric voltage is then applied to the bottom electrode 7 and the top electrode (not shown in the figure) thus initiating the separation. The electrode chamber 4 is given a somewhat higher pressure than the elution chamber 20 either by applying a pressure to the electrolyte circulating within the electrode chamber or by connecting the lower end of the tube 15 to a vacuum pump which keeps a sub-pressure in the elution chamber 20. Due to the pressure difference the electrolyte will flow from the electrode chamber 4 through the membrane 18 and into the elution chamber 20 as indicated by the arrows, i.e. upwards and radially inwards in the elution chamber towards the upper end of the outlet channel 15 and the elution liquid will be drained from the apparatus through the tube 15. The radial liquid flow through the elution chamber will imply an effective elution all over the surface of the porous membrane 19 and thus the separated substances which reach the elution chamber 20 from the column 1 zone by zone will be efficiently eluted through the outlet channel 15.

Figure 2:
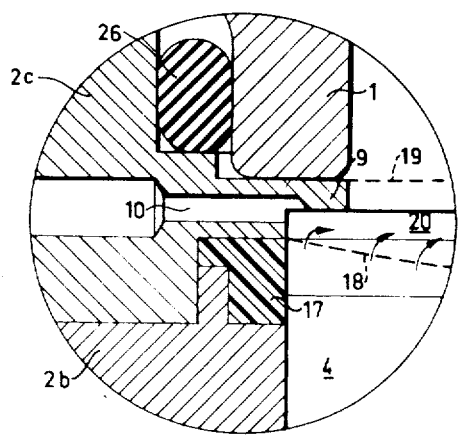
FIG. 2 is an enlarged fragmentary view of the apparatus according to FIG. 1.
Figure 3:
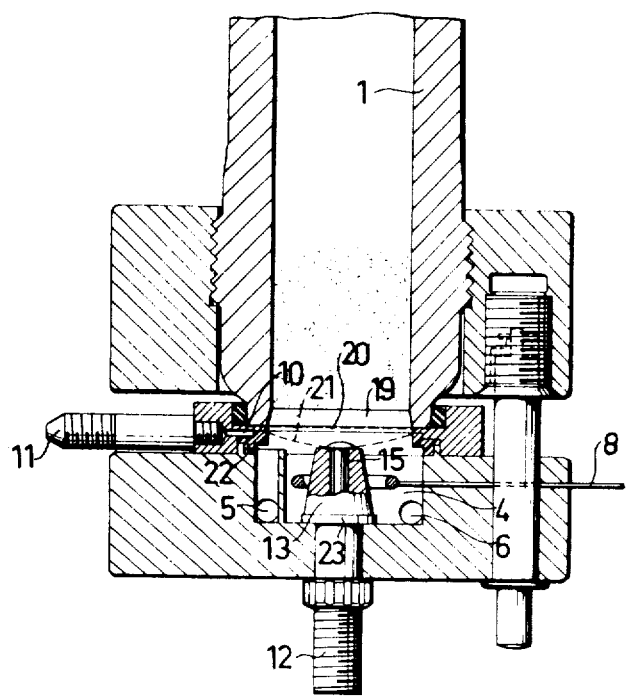
FIG. 3 is a cross sectional view of a modification of an apparatus according to FIG. 1 comprising an elution chamber to be used when the column is containing a powder.
Figure 4:
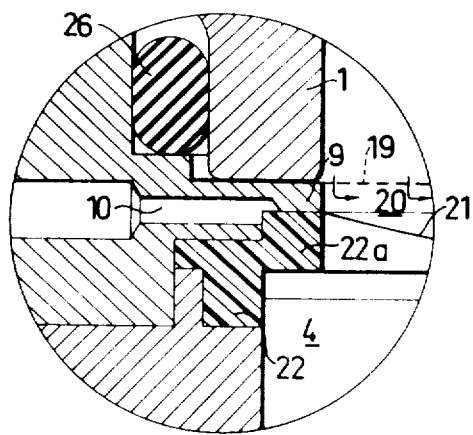
FIG. 4 is an enlarged fragmentary view of the arrangement according to FIG. 3.

FIGS. 3 and 4 show a modified embodiment of the apparatus according to FIGS. 1 and 2. The embodiment according to FIGS. 3 and 4 is adapted to be used with a column containing a powder. Corresponding parts have the same references as in FIGS. 1 and 2. The ring 17 according to FIGS. 1 and 2 has been replaced by a ring 22 which has an inner portion 22a, the upper surface of which engages the lower surface of the flange 9 and the inner surface of which has the same diameter as this flange. The ring 22a tightens the mouth of the channel 10. The ring 22a has been provided with a semi-permeable membrane 21 preferably a dialysis membrane the central part of which has been attached to the head 13 in a similar manner as in FIG. 1. As the ring 22 is higher than the ring 17 in FIGS. 1 and 2, the height of the elution chamber 20 is reduced in comparison with FIGS. 1 and 2. The head 13 has been raised correspondingly by means of a distance ring 23 inserted under the head 13. During the electrophoretic separation no electrolyte will pass from the electrode chamber 4 up into the elution chamber 20 through the membrane 21, but the elution of the different zones of separated substances will take place by means of the liquid that passes from the column 1 through the porous membrane 19, the elution chamber 20 to the outlet channel 15.

Figure 5:
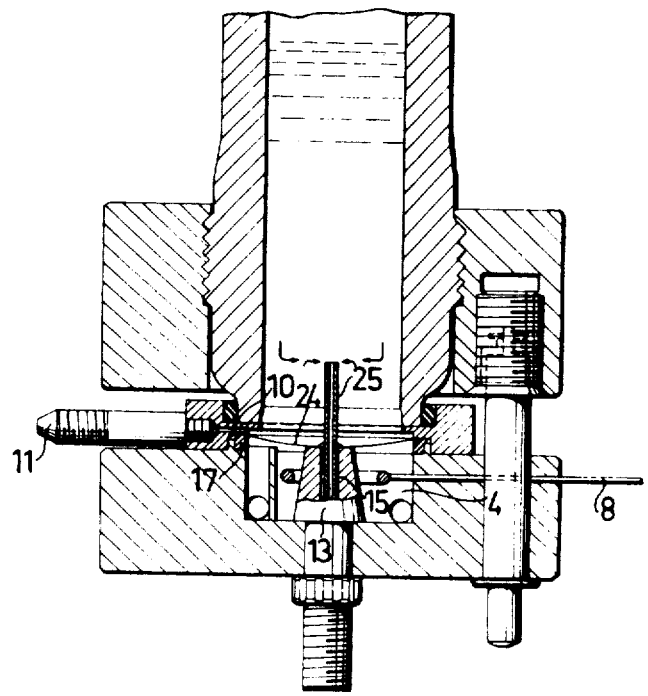
FIG. 5 is a cross sectional view of a second modification of the apparatus according to FIG. 1, comprising an elution chamber to be used in a column containing a liquid having a density gradient.
Figure 6:
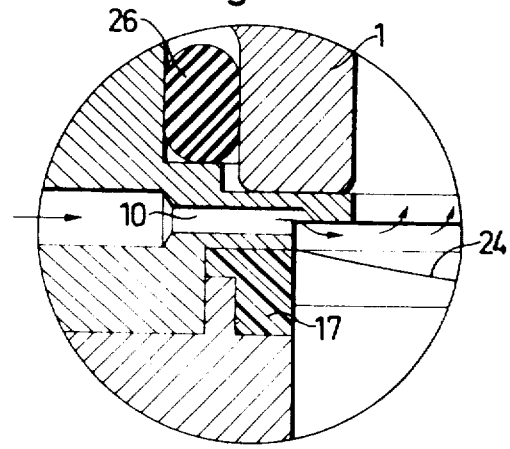
FIG. 6 is an enlarged fragmentary view of the apparatus according to FIG. 5.

FIGS. 5 and 6 show the apparatus according to the invention modified for use in combination with a column containing a liquid having a density gradient. The corresponding parts have the same references as in the previous figures. According to the embodiment in FIGS. 5 and 6 the same ring 17 as in FIG. 1 is used. A semipermeable dialysis membrane 24 has been attached to this ring the central part of the membrane being attached to the head 13 as described above. The outlet channel has been prolonged upwards by insertion of a tube 25 having a length of 1–2 cm. in the upper part of the tube 15. The membrane 19 of FIGS. 1–4 is not present in the modification according to FIGS. 5 and 6. During the electrophoretic separation the column 1 is filled with a solution having a density gradient, the density increasing downwards in the column. A solution having a higher density than the most concentrated solution in the column is supplied to the bottom of the column through the connection tube 11 and the channel 10. The lower end of the tube 15 is connected to a suction pump which drains liquid at a velocity which is 5–10 times higher than the velocity by which liquid is supplied through the channel 10. As a consequence of this a horizontal liquid layer is formed at the upper end of the tube 25, the liquid from the column coming in contact with the heavier liquid supplied from below within this layer. In the stable liquid layer liquid will flow radially inwards and pass out from the apparatus through the tubes 25 and 15 and thus carrying out the different separated zones of various substances.

The arrangement shown in FIGS. 5 and 6 is adapted to be used if the elution takes place in an electric field. Elution of density gradients with no electric field could be carried out if the electrolyte in the electrode chamber is removed.

I claim:

1. Apparatus for electrophoretic separation comprising a column for the substances to be separated, electrodes at the upper and lower end of said column and an outlet for the separated substances at the lower end of the column, characterized in, that the lower end of the column is provided with an electrode chamber (4) comprising the lower end electrode (7) and being provided with an inlet (6) and an outlet (5) for an electrolyte, the apparatus further comprising an elution chamber (20) located above the electrode chamber and separated from the electrode chamber by a membrane (18), the centre of the elution chamber being connected to the elution outlet (15) extending downward from said elution chamber, the upper end of the elution chamber (20) having a diameter substantially equal to the diameter of the column (1) above the elution chamber and the lower end of the elution chamber which is delimited by the porous membrane (18) having a diameter larger than the diameter of the upper end of the chamber.

2. Apparatus according to claim 1, characterized in, that a tubular head (17) is arranged in the centre of the electrode chamber, and a tube (15) provided with a flange (16) is arranged to be inserted through a central bore of the membrane (18) and through the tubular head (13), the central part of the membrane (18) thus being clamped between the flange (16) and the head (13) and the tube (15) forming the elution outlet of the elution chamber.

3. Apparatus according to claim 2, characterized in, that the lower end electrode (7) forms a ring around the head (13).

4. Apparatus according to claim 1, characterized in, that the wall of the upper part of the elution chamber (20) is formed by a radially inwards extending flange (9) the upper surface of which forms a seat for the lower end of the column (1).

5. Apparatus according to claim 1, characterized in, that a venting channel (10) is arranged in the wall of the elution chamber.

6. Apparatus according to claim 4, characterized in, that the upper part of the wall of the electrode chamber (4) is formed by a releasably mounted ring (17) which can be replaced by a ring (22) engaging the lower surface of the flange (9) and having the same inner diameter as the flange.

References Cited

UNITED STATES PATENTS

| | | | |
|---|---|---|---|
| 3,375,187 | 3/1968 | Buchler | 204—299 X |
| 3,453,200 | 7/1969 | Allington | 204—299 X |
| 3,539,493 | 11/1970 | Dorman | 204—299 |
| 3,579,433 | 5/1971 | Dahlgren | 204—299 |

HOWARD S. WILLIAMS, Primary Examiner

A. C. PRESCOTT, Assistant Examiner

U.S. Cl. X.R.

204—180 G